(12) United States Patent
Pastushenko et al.

(10) Patent No.: US 11,847,321 B2
(45) Date of Patent: Dec. 19, 2023

(54) SYSTEMS AND METHODS FOR ADJUSTING STORAGE VOLUME SIZE OF AN APPLICATION INSTANCE

(71) Applicant: Cloud Linux Software Inc., Estero, FL (US)

(72) Inventors: Arsenii Pastushenko, Kiyv (UA); Igor Seletskiy, Palo Alto, CA (US); Raushan Myrzashova, Estero, FL (US)

(73) Assignee: CLOUD LINUX SOFTWARE, INC., Estero, FL (US)

( * ) Notice: Subject to any disclaimer, the term of this patent is extended or adjusted under 35 U.S.C. 154(b) by 58 days.

(21) Appl. No.: 17/550,361

(22) Filed: Dec. 14, 2021

(65) Prior Publication Data

US 2023/0185450 A1 Jun. 15, 2023

(51) Int. Cl.
*G06F 3/00* (2006.01)
*G06F 3/06* (2006.01)
*G06N 20/00* (2019.01)

(52) U.S. Cl.
CPC .......... *G06F 3/0608* (2013.01); *G06F 3/0631* (2013.01); *G06F 3/0665* (2013.01); *G06F 3/0673* (2013.01); *G06N 20/00* (2019.01)

(58) Field of Classification Search
None
See application file for complete search history.

(56) References Cited

U.S. PATENT DOCUMENTS

| 2010/0169553 | A1* | 7/2010 | Yano | G06F 12/0246 |
| | | | | 711/E12.001 |
| 2019/0018595 | A1* | 1/2019 | Gupta | G06F 3/0631 |
| 2020/0104065 | A1* | 4/2020 | Chen | G06F 3/0689 |

* cited by examiner

*Primary Examiner* — Midys Rojas
(74) *Attorney, Agent, or Firm* — ArentFox Schiff LLP; Michael Fainberg

(57) ABSTRACT

Disclosed herein are systems and method for adjusting storage volume size of an application instance. A method may include: identifying a first application instance running on a computing device, wherein the first application instance has an assigned first storage volume on a device storage of the computing device; collecting, over a period of time, usage data of the device storage; determining, based on the collected usage data, whether a usage capacity of the first storage volume of the first application instance is reaching a maximum capacity of the first storage volume; in response to determining that the usage capacity of the first storage volume is reaching the maximum capacity of the first storage volume, adjusting a size of the first storage volume by a first amount to accommodate usage of the first application instance.

17 Claims, 4 Drawing Sheets

SYSTEMS AND METHODS FOR ADJUSTING STORAGE VOLUME SIZE OF AN APPLICATION INSTANCE

FIELD OF TECHNOLOGY

The present disclosure relates to the field of data storage, and, more specifically, to systems and methods for adjusting storage volume size of an application instance.

BACKGROUND

As technology is progressing to become more data-intensive, the challenges of storing and managing data are growing. For example, there exist a number of issues related to managing storage resources required in a system with multiple application instances and with growing and shrinking storage needs.

The first issue relates to the storage volume of a particular application instance running in such a system. Initially, a user specifies a storage volume size when creating an application instance. This volume size does not change over time. After a certain amount of write requests, the application instance storage volume becomes filled with data. An issue occurs when an application receives a storage write request, and there is no storage space available on that particular volume. Then, an error event occurs and the application enters a failed state when it is no longer functioning properly. In order to resolve this issue and execute write requests again, the user or a system administrator has to either manually enlarge the storage volume capacity or delete the data from this particular storage volume.

The second issue relates to automatic storage space extension when limited storage capacity is available in the particular computing system. If a storage capacity reserved for a particular instance was enlarged several times or the application was provisioned with more storage than required and after that the user deleted data that is no longer needed, the volume of the application will still hold the storage capacity that is not used. This may lead to infrastructure availability issues, due to the system being out of available storage capacity.

SUMMARY

In one exemplary aspect, the techniques described herein relate to a method for adjusting storage volume size of an application instance, the method including: identifying a first application instance running on a computing device, wherein the first application instance has an assigned first storage volume on a device storage of the computing device; collecting, over a period of time, usage data of the device storage; determining, based on the collected usage data, whether a usage capacity of the first storage volume of the first application instance is reaching a maximum capacity of the first storage volume; in response to determining that the usage capacity of the first storage volume is reaching the maximum capacity of the first storage volume, adjusting a size of the first storage volume by a first amount to accommodate usage of the first application instance.

In some aspects, the techniques described herein relate to a method, wherein adjusting the size of the first storage volume includes: identifying free space on the device storage; allocating at least a portion of the free space to the first storage volume, wherein the at least the at portion of the free space is the first amount.

In some aspects, the techniques described herein relate to a method, wherein a second application instance is concurrently running with the first application instance, wherein the second application instance has an assigned second storage volume, and wherein adjusting the size of the first storage volume further includes: determining, based on the collected usage data, that a usage capacity of the second storage volume is below a maximum capacity of the second storage volume by at least the first amount; and reducing a size of the second storage volume by the first amount.

In some aspects, the techniques described herein relate to a method, wherein a plurality of application instances including the first application instance is running on the computing device, wherein each application instance has an assigned respective storage volume on the device storage, and wherein adjusting the size of the first storage volume further includes: executing a machine learning algorithm that is trained to output volume sizes for the plurality of application instances based on historical usage data of the plurality of application instances, wherein the machine learning algorithm indicates a new volume size for the first storage volume that is greater than a current volume size of the first storage volume by the first amount.

In some aspects, the techniques described herein relate to a method, further including: generating for the machine learning algorithm an input vector that indicates changes in system usage, volume usage, and application instance usage over the period of time based on the collected usage data, wherein the collected usage data is time series data.

In some aspects, the techniques described herein relate to a method, further including: subsequent to adjusting the size of the first storage volume, determining that the usage capacity of the first storage volume has decreased below the maximum capacity of the first storage volume; and readjusting, during runtime of the first application instance, the size of the first storage volume to the usage capacity that is less than the maximum capacity of the first storage volume.

In some aspects, the techniques described herein relate to a method, wherein adjusting the size of the first storage volume is further in response to determining that the usage capacity of the first storage volume will reach the maximum capacity of the first storage volume within a threshold period of time based on write requests of the first application instance.

In some aspects, the techniques described herein relate to a method, wherein adjusting the size of the first storage volume is further in response to determining that an amount of write requests of the first application instance has reached a threshold amount of write requests.

In some aspects, the techniques described herein relate to a method, wherein adjusting the size of the first storage volume is further in response to determining that a rate of write requests of the first application instance over the period of time exceeds a threshold rate of write requests.

It should be noted that the methods described above may be implemented in a system comprising a hardware processor. Alternatively, the methods may be implemented using computer executable instructions of a non-transitory computer readable medium.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplarily pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Exemplary aspects are described herein in the context of a system, method, and computer program product for adjusting storage volume size of an application instance. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

The present disclosure addresses issues stated above by utilizing a number of space optimization and volume extension techniques. More specifically, the present disclosure focuses on how to overcome issues related to storage volume exhaustion and how to optimize the storage space used by a computing device.

Figure 1:
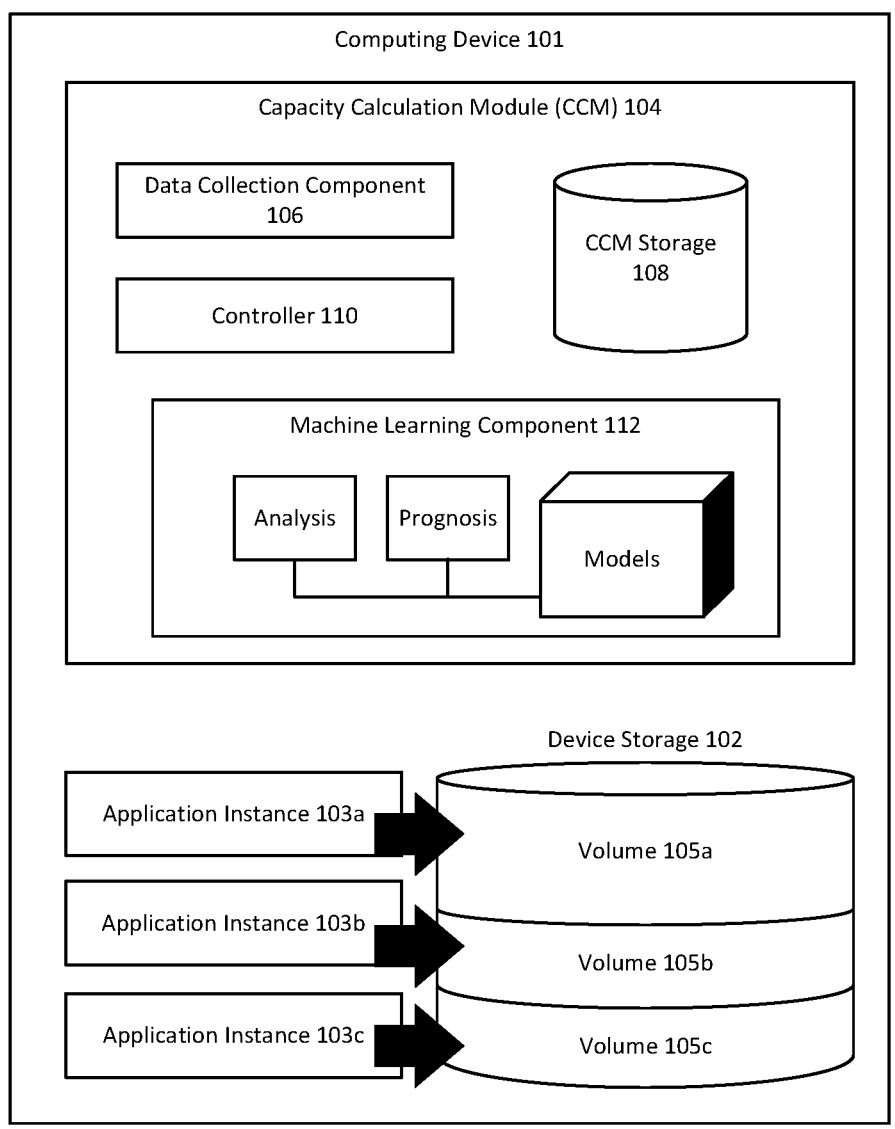
FIG. 1 is a block diagram illustrating a system for adjusting storage volume size of an application instance.

FIG. 1 is a block diagram illustrating system 100 for adjusting the size of an application instance storage volume. In system 100, computing device 101 includes three running application instances 103a, 103b, and 103c. Three application instances are depicted for simplicity. In some aspects, there may be more than three or fewer application instances running on a given computing device 101. Computing device 101 further includes device storage 102, which includes three volumes 105a, 105b, and 105c—one for each application instance. Lastly, computing device 101 includes capacity calculation module (CCM) 104. CCM 104 includes a plurality of module components such as data collection component 106, CCM storage 108, controller 110, and machine learning component 112.

It should be noted that, in some aspects, CCM 104 may be divided into a thin client application and a thick client application. The thick client application may be stored on a remote server connected to computing device 101 (e.g., via the Internet) and may perform processing-intensive actions such as training the models employed by machine learning component 112 and making decisions about storage utilization on device storage 102. The thin client application may transmit data collected on computing device 101 to the remote server and may communicate with device storage 102 to adjust the volume sizes based on decisions made by the thick client application.

CCM 104 employs a space optimization method which involves evaluating the storage volume size reserved by the system for a particular application instance and modifying the volume size at run time to prevent the exhaustion of a storage infrastructure. Data collection component 106 collects system usage data, volume usage data, and application usage data, each of which describes how computing device 102 is utilized. The system usage data includes: total system instances, total volume capacity reserved, total volume capacity used, etc. Volume usage data includes: volume size reserved, volume size used, etc. Application data includes: number of instances created, number of instances running, lifespan of instances, etc. Data collection component 106 stores the collected data as time series data in CCM storage 108. In some aspects, this data is categorized by data collection component 106 and each data point gets assigned a numerical weight. For example, newer data points receive a higher weight than the older ones.

In some aspects, CCM 104 uses machine learning algorithms to analyze current usage of device storage 102 and makes a prognosis for further volume size modifications. For example, the collected data in CCM storage 108 is analyzed using machine learning component 112 to determine the optimal volume size for a specific application instance storage volume. Machine learning component 112 calculates an optimal storage volume capacity for an application instance based on collected historical data stored in CCM storage 108. More specifically, given the time series data in CCM storage 108, machine learning component 112 employs a process as a prior over functions to calculate the distance between a test point (e.g., a current status data point) and all the training points (e.g., historic data of application instance usage). In some aspects the training points are those data points that describe instances historically run by other users for some time period.

In some aspects, linear regression is used to estimate real values (storage volume size) based on continuous variables. It should be noted that the methods described above may be implemented in any system with unstable storage needs to avoid the problem of overfitting. Moreover, linear regression is not the only machine algorithm which can be used or shows high effectiveness in this specific task. Gaussian process regression or gradient boosting algorithms can be used in a machine learning pipeline for data analysis and prognosis as well.

Figure 2:
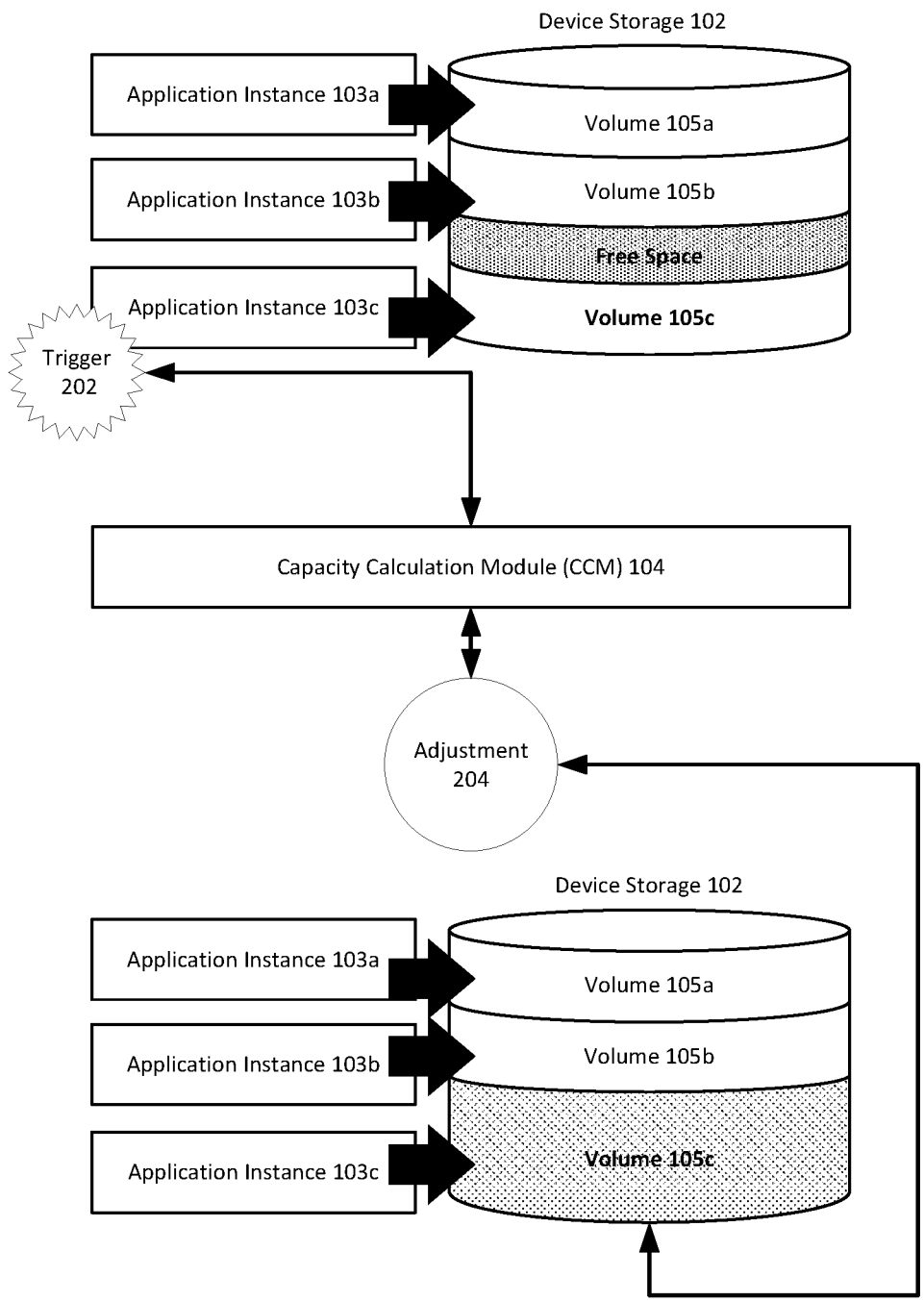
FIG. 2 is a block diagram illustrating an example of an adjustment made by a capacity calculation module.

FIG. 2 is a block diagram illustrating example 200 of an adjustment made by a capacity calculation module. Example 200 relates to transitioning from a static storage volume size provided by the user to a dynamic value generated by CCM 104.

For example, a user may create application instance 103a. Conventionally, the user selects the amount of storage from device storage 102 (i.e., a storage volume size) to allocate to application instance 103a. In some aspects, if the user does not select the amount, the minimum amount needed by application instance 103a is automatically assigned (assuming that the minimum amount is available in free space). As discussed previously, the demand and utilization of application instance 103a may change overtime. Likewise, a user may create other application instances 103b and 103c, which compete for the resources of device storage 102. CCM 104 monitors the usage and needs of each application instance 103 and generates/adjusts storage volumes accordingly. For example, application instance 103a may have a storage volume 105a, application instance 103b may have a storage volume 105b, and application instance 103c may have a storage volume 105c. There may also be free space on device storage 102. If application instance 103c is executing multiple write actions and requires more space, volume 105c will ideally be increased in size to make accommodations.

In some aspects, CCM 104 is queried manually or is triggered by a set of pre-configured triggers. Trigger 202 may include: a specific date or time, a specific event (e.g., the threshold time before the storage volume is predicted to fill up) or a set of events (e.g., a storage volume is a threshold amount full, a rate of write requests has exceeded a threshold rate). Suppose that in example 200, data collection component 106 collects system usage data, volume usage data, and application usage device, and stores the collected data in CMM storage 108. Based on the collected data, controller 110 detects that the rate of write requests of application instance 103c is increasing beyond a threshold rate of 25 writes per minute. Based on detecting this trigger 202, controller 110 generates an input vector for machine learning component 112. Machine learning component 112 selects a trained model, which accepts the input vector, and outputs adjustment 204. Adjustment 204 may be an output vector with a new size for at least one volume in device storage 102. Controller 110 may apply adjustment 204 to device storage 102 (e.g., update the volume sizes). For example, in example 200, adjustment 204 may allocate the remaining free space in device storage 102 to volume 105c. This will accommodate the write requests of application instance 103c.

Figure 3:
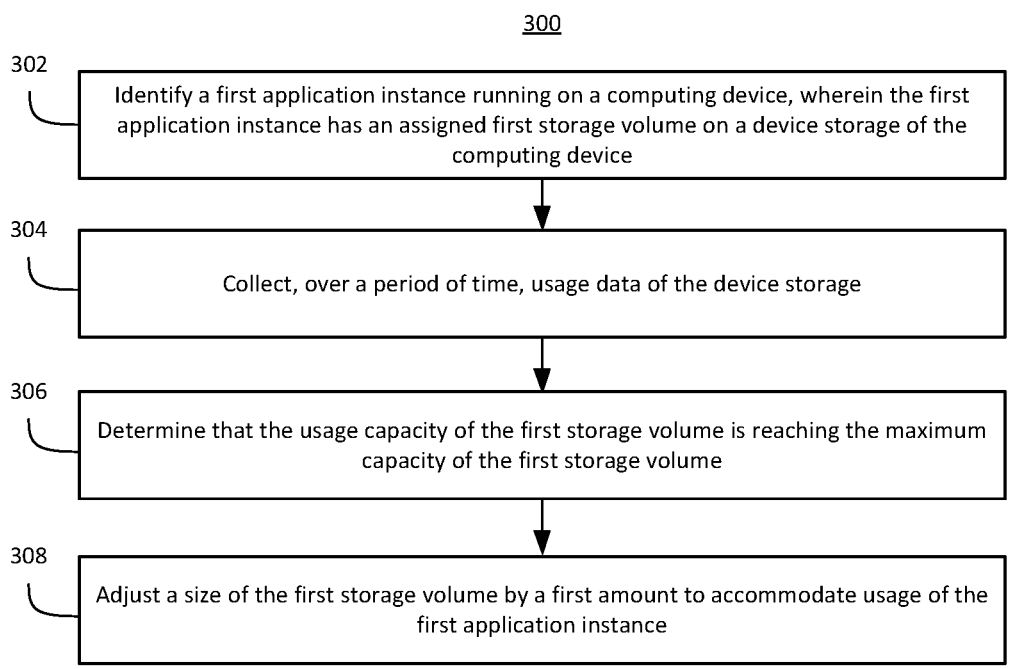
FIG. 3 illustrates a flow diagram of a method for adjusting storage volume size of an application instance.

FIG. 3 illustrates a flow diagram of method 300 for adjusting storage volume size of an application instance. At 302, CCM 104 identifies a first application instance running on a computing device, wherein the first application instance has an assigned first storage volume on a device storage of the computing device. For example, CCM 104 may identify application instance 103a on computing device 101 and may determine that application instance 103a is assigned volume 105a of device storage 102.

At 304, CCM 104 may collect, over a period of time, usage data of the device storage. For example, data collection component 106 may college time series data that includes system usage, volume usage, and application instance usage information. As described previously, the system usage data includes: total system instances, total volume capacity reserved, total volume capacity used, etc. Volume usage data includes: volume size reserved, volume size used, etc. Application data includes: number of instances created, number of instances running, lifespan of instances, etc. Accordingly, data collection component 106 may determine that at a given time (e.g., 1:14:00 pm), there are 3 application instances running, the total volume is 8 GB, each volume has a maximum capacity of 2 GB, there is 2 GB of free space, application instance 103a has utilized 1.9 GB of its maximum capacity, application instance 103b has utilized 1.2 GB of its maximum capacity, application instance 103c has utilized 1.5 GB of its maximum capacity, the write rate of application instance 103a is 0.4 GB/minute, etc. In some aspects, data collection component 106 may store the collected usage data in CCM storage 108.

In some aspects, controller 110 may collect the information stored in CCM storage and generate an input data structure (e.g., a multi-dimensional array) for machine learning component 112. For example, the input vector for data collected over a period of time between 1:12:00 pm and 1:14:00 pm may be:

| Timestamp | 1:12:00 | 1:12:30 | 1:13:00 | 1:13:30 | 1:14:00 |
|---|---|---|---|---|---|
| Total Storage (GB) | 8 | 8 | 8 | 8 | 8 |
| Free Space (GB) | 4 | 4 | 2 | 2 | 2 |
| Running Instances | 2 | 2 | 3 | 3 | 3 |
| Instance 103a | | | | | |
| Storage Volume Size (GB) | 2 | 2 | 2 | 2 | 2 |
| Usage Capacity (GB) | 1 | 1.2 | 1.4 | 1.7 | 1.9 |
| Write Request Rate (GB/min) | — | 0.4 | 0.4 | 0.6 | 0.4 |
| Lifetime (s) | 120 | 150 | 180 | 210 | 240 |
| Instance 103b | | | | | |
| Storage Volume Size (GB) | 2 | 2 | 2 | 2 | 2 |
| Usage Capacity (GB) | 1 | 1 | 1 | 1 | 1.2 |
| Write Request Rate (GB/min) | — | 0 | 0 | 0 | 0.4 |
| Lifetime (s) | 60 | 90 | 120 | 150 | 180 |
| Instance 103c | | | | | |
| Storage Volume Size (GB) | 0 | 0 | 2 | 2 | 2 |
| Usage Capacity (GB) | 0 | 0 | 1.1 | 1.3 | 1.5 |
| Write Request Rate (GB/min) | — | — | — | 0.4 | 0.4 |
| Lifetime (s) | 0 | 0 | 30 | 60 | 90 |

It should be noted that the usage data collected by data collection component 106 is not limited to the data shown above. For example, data collection component 106 may also track the network usage of an application instance (e.g., uploading/downloading rates), memory usage (e.g., RAM), CPU utilization, amount of user interaction (e.g., the number of manual clicks, selections, etc., made by a user for an application instance, etc.

At 306, CCM 104 may determine that the usage capacity of the first storage volume is reaching the maximum capacity of the first storage volume. For example, referring to instance 103a, at 1:14:00, the instance has a usage capacity of 1.9 GB and the maximum capacity is 2 GB. Controller 110 may determine that the difference between the maximum capacity and the usage capacity of instance 103a is 0.1 GB. In some aspects, controller 110 may compare this difference against a predetermined threshold difference (e.g., 0.1 GB). In response to determining that the difference is less than or equal to the threshold difference, controller 110 may determine that the usage capacity is reaching the maximum capacity of the first storage volume of instance 103a.

In some aspects, determining whether the usage capacity is reaching the maximum capacity is specifically based on determining whether the usage capacity of the first storage volume will reach the maximum capacity of the first storage volume within a threshold period of time based on write requests of the first application instance. For example, controller 110 may identify, for instance 103a, the latest write request rate (e.g., 0.4 GB/min) or may determine the average write request rate over the period of time (e.g., 0.45 GB/min). Based on the write request rate, controller 110 may determine an amount of time left before the maximum capacity is reached. For example, if the average write request rate is used, controller 110 will calculate that the maximum capacity will be reached in 13 seconds. The threshold period of time may be a predetermined value such as 30 seconds (which may also be the interval length at which data collection component 106 collects information during the period of time). In response to determining that the calculated time (e.g., 13 seconds) is less than or equal to the threshold period of time (e.g., 30 seconds), controller 110 may determine that the maximum capacity will be reached. In some aspects, the threshold period of time is specific to an instance 103. For example, controller 110 may determine the amount of time that an instance is used historically and compare the amount of time to the lifespan value. If the amount of time that the instance is historically used is 250 seconds and the lifespan value is 240 seconds, controller 110 may determine that the instance 103a will be terminated in 10 seconds. Accordingly the threshold period of time is set to 10 seconds. In this case, because the calculated time until maximum capacity will be reached is greater than the threshold period of time, controller 110 will determine that the maximum capacity will not be reached.

In some aspects, the rate of write requests itself may be compared with a threshold rate of write requests. For example, controller 110 may determine a global write request rate over the period of time. Referring to the example of instance 103a, the global write request rate is calculated by taking a difference of the first usage capacity and the second usage capacity and dividing the difference over the length of the period of time (e.g., (1.9−1.0)/2=0.45 GB/min). In response to determining that a rate of write requests of the first application instance over the period of time (e.g., 0.45 GB/min) exceeds a threshold rate of write requests (0.4 GB/min) that is predetermined, controller 110 may determine that the usage capacity is reaching maximum capacity.

In yet some other aspects, controller 110 may determine whether the usage capacity is reaching the maximum capacity by determining that an amount of write requests of the first application instance has reached a threshold amount of write requests. For example, controller 110 may determine that an amount of 0.9 GB has been written to the first storage volume over the period of time. Controller 110 may compare this value to a threshold amount (e.g., 0.9 GB) that is predetermined. In response to determining that the amount of write requests (0.9 GB worth) has reached the threshold amount, controller 110 may determine that the usage capacity is reaching the maximum capacity.

In response to determining that the usage capacity is reaching the maximum capacity, method 300 advances to 308, where CCM 104 adjusts a size of the first storage volume by a first amount to accommodate usage of the first application instance. For example, CCM 104 may communicate with a management module of device storage 102 to increase the maximum capacity of the first storage volume from 2 GB to 2.5 GB (e.g., increase by 0.5 GB).

From a basic level, the first amount is taken from any free space available on device storage 102 (see FIG. 2). More specifically, controller 110 may identify free space (e.g., 2 GB) on device storage 102 and allocate at least a portion of the free space (e.g., 0.5 GB) to the first storage volume, wherein the at least the at portion of the free space is the first amount described above.

In some aspects, there may be no free space or not enough free space to allocate. Accordingly, controller 110 may identify a second application instance that is concurrently running with the first application instance 103a. Here, the second application instance has an assigned second storage volume. Referring to the data stored in CCM storage 108, controller 110 may determine that there is more than one application instance running concurrently with instance 103a. Controller 110 may select an instance that has the lowest usage capacity, the lowest write request rate, the shortest remaining lifespan, the lowest utilization percentage of capacity (e.g., usage capacity divided by maximum capacity), or any combination of the above.

Specifically, controller 110 may then determine whether, based on the collected usage data, that a usage capacity of the second storage volume of the selected application instance is below a maximum capacity of the second storage volume by at least the first amount. For example, controller 110 may select instance 103b over instance 103c because instance 103b has the lowest utilization (e.g., 1.2/2 compared to 1.5/2) of the two candidate instances. In response to determining that instance 103b is below its maximum capacity by at least the first amount (e.g., 0.5 GB), controller 110 reduces a size of the second storage volume by the first amount and increases a size of the first storage volume by the first amount. Accordingly, the storage volume of application instance 103a becomes 2.5 GB and the storage volume of application instance 103b becomes 1.5 GB (which still holds 1.2 GB).

In some aspects, controller 110 may determine that the first amount is not available in free space or one of the selected instances. Accordingly, controller 110 may reduce multiple maximum capacities of the running instances to increase the maximum capacity of instance 103a. For example, if instances 103b and 103c do not have the first amount of space to relinquish because they are utilizing the space, controller 110 may reduce their maximum capacities to their usage capacities and take the combined free space to allocate to instance 103a. It should be noted that the action of adjusting sizes is dynamic. Thus at 1:14:00 pm, controller 110 may make a first adjustment and at the next data collection point (e.g., 1:14:30 pm), controller 110 may make another adjustment.

For example, subsequent to adjusting the size of the first storage volume, controller 110 may determine that the usage capacity of the first storage volume has decreased below the maximum capacity of the first storage volume. For example, at 1:14:30 pm, controller 110 may determine based on the data stored in CCM storage 108 that the usage capacity has increased to 2.2 GB (which is accommodated because the maximum capacity is 2.5 GB). However, at 1:15:00 pm, controller 110 may determine that the usage capacity has dropped to 1.7 GB. Accordingly, controller 110 may readjust, during runtime of the first application instance, the size of the first storage volume to the usage capacity that is less than the maximum capacity of the first storage volume. In this case, the readjustment is also based on the usage data associated with the other instances. For example, if instance 103c begins to increase its write request rate and is reaching its maximum capacity, controller 110 may decrease the size of the first storage volume and increase the size of the third storage volume associated with instance 103c.

In some aspects, the first amount is a predetermined value. For example, controller 110 may be configured to increase or decrease memory in intervals of 0.5 GB. In some aspects, the first amount is dynamically determined based on the amount of free space remaining in device storage 102. For example, if there is 2 GB of free space, the first amount may be any value between 0.1 GB to 2 GB. In some aspects, the first amount is a fraction of the unused capacity from each of the running instances. For example, controller 110 may determine that at a given time, there is 0.7 GB of space that is allocated to a set of running instance(s) and is not being actively used for write requests by the running instance(s). Accordingly, controller 110 may set the first amount to 0.7 GB.

In some aspects, the first amount is determined by a machine learning model trained by machine learning component 112. For example, a plurality of application instances 103 may be running on computing device 101 and each application instance may have an assigned respective storage volume on the device storage 102. CCM 104 may execute a machine learning algorithm (e.g., a model that utilizes regression) that is part of machine learning component 112. The machine learning algorithm may be trained to output volume sizes for the plurality of application instances based on historical usage data of the plurality of application instances. More specifically, the machine learning algorithm may indicate a new volume size for the first storage volume that is greater than a current volume size of the first storage volume by the first amount.

An input vector in the training dataset of the model may be structured as the input data structure shown previously. However, the training dataset may include additional output vectors that indicate adjustments made to the storage volumes based on the input vector data. Referring to the input data structure, the additional column may indicate that the maximum capacity of each running instance is made 2.5, 1.5, 2 for instance 103a, 103b, and 103c, respectively. Likewise there may be several input and output vector combinations in the training dataset. In some aspects, the input and output vectors may capture activity taken from other computing devices that may or may not be related to computing device 101. Machine learning component 112 may train a machine learning algorithm based on the input/output vector combinations such that the machine learning algorithm can accept an input vector (e.g., a multi-dimensional array shown previously) and output a vector that indicates that adjustments (if any) to make to each running instance's storage volume.

Figure 4:
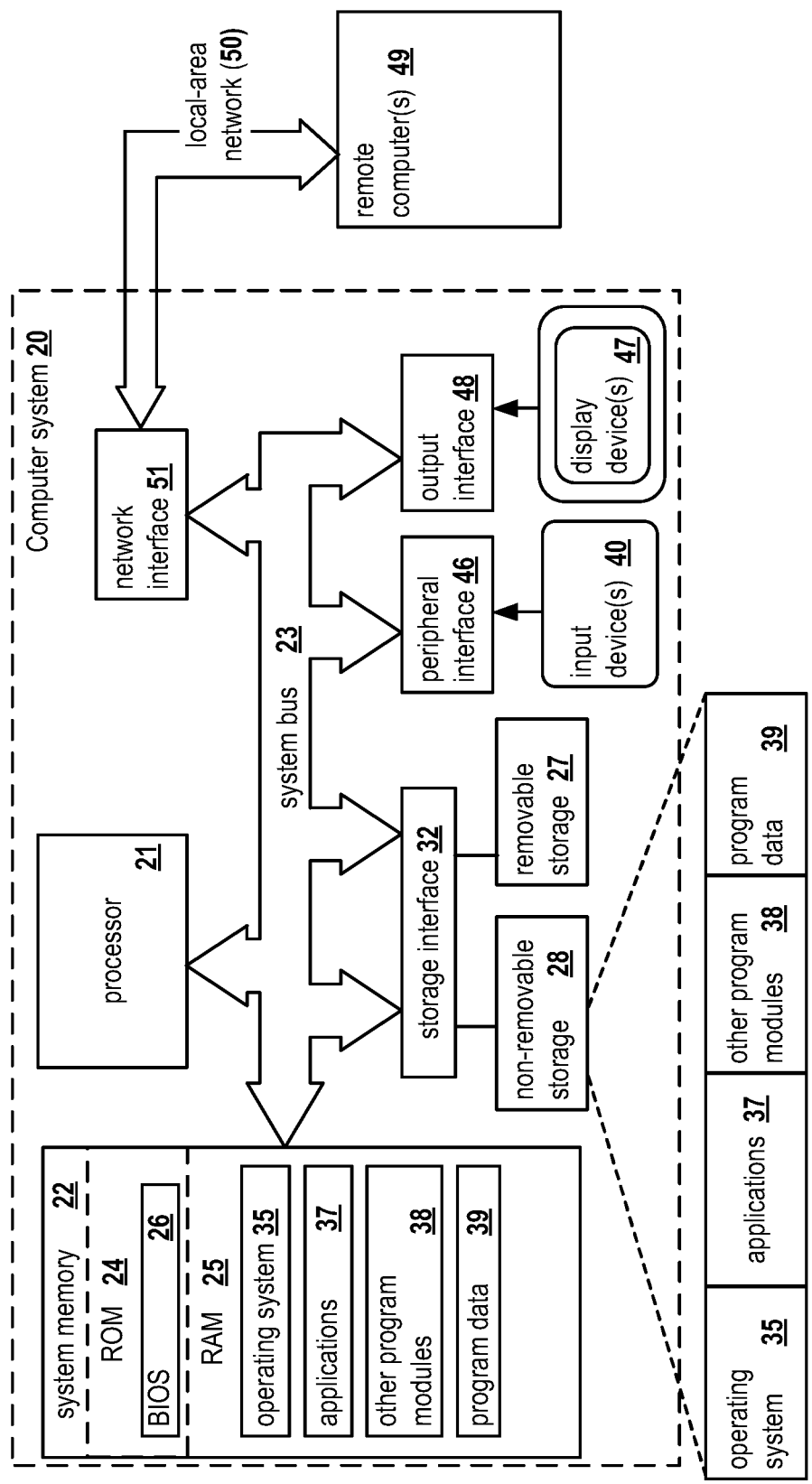
FIG. 4 presents an example of a general-purpose computer system on which aspects of the present disclosure can be implemented.

FIG. 4 is a block diagram illustrating a computer system 20 on which aspects of systems and methods for adjusting the size of an application instance storage volume may be implemented in accordance with an exemplary aspect. The computer system 20 can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, Hyper-Transport™, InfiniBand™, Serial ATA, I²C, and other suitable interconnects. The central processing unit 21 (also referred to as a processor) can include a single or multiple sets of processors having single or multiple cores. The processor 21 may execute one or more computer-executable code implementing the techniques of the present disclosure. For example, any of commands/steps discussed in FIGS. 1-3 may be performed by processor 21. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices.

The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system. Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of those skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for adjusting storage volume size of an application instance, the method comprising:
   identifying a first application instance running on a computing device, wherein the first application instance has an assigned first storage volume on a device storage of the computing device;
   collecting, over a period of time, usage data of the device storage;
   determining, based on the collected usage data, whether a usage capacity of the first storage volume of the first application instance is reaching a maximum capacity of the first storage volume;
   in response to determining that the usage capacity of the first storage volume is reaching the maximum capacity of the first storage volume, adjusting a size of the first storage volume by a first amount to accommodate usage of the first application instance;
   subsequent to adjusting the size of the first storage volume, determining that the usage capacity of the first storage volume has decreased below the maximum capacity of the first storage volume; and
   readjusting, during runtime of the first application instance, the size of the first storage volume to the usage capacity that is less than the maximum capacity of the first storage volume.

2. The method of claim 1, wherein adjusting the size of the first storage volume comprises:
 identifying free space on the device storage;
 allocating at least a portion of the free space to the first storage volume, wherein the at least the at portion of the free space is the first amount.

3. The method of claim 1, wherein a second application instance is concurrently running with the first application instance, wherein the second application instance has an assigned second storage volume, and wherein adjusting the size of the first storage volume further comprises:
 determining, based on the collected usage data, that a usage capacity of the second storage volume is below a maximum capacity of the second storage volume by at least the first amount; and
 reducing a size of the second storage volume by the first amount.

4. The method of claim 1, wherein a plurality of application instances comprising the first application instance is running on the computing device, wherein each application instance has an assigned respective storage volume on the device storage, and wherein adjusting the size of the first storage volume further comprises:
 executing a machine learning algorithm that is trained to output volume sizes for the plurality of application instances based on historical usage data of the plurality of application instances, wherein the machine learning algorithm indicates a new volume size for the first storage volume that is greater than a current volume size of the first storage volume by the first amount.

5. The method of claim 4, further comprising:
 generating for the machine learning algorithm an input vector that indicates changes in system usage, volume usage, and application instance usage over the period of time based on the collected usage data, wherein the collected usage data is time series data.

6. The method of claim 1, wherein adjusting the size of the first storage volume is further in response to determining that the usage capacity of the first storage volume will reach the maximum capacity of the first storage volume within a threshold period of time based on write requests of the first application instance.

7. The method of claim 1, wherein adjusting the size of the first storage volume is further in response to determining that an amount of write requests of the first application instance has reached a threshold amount of write requests.

8. The method of claim 1, wherein adjusting the size of the first storage volume is further in response to determining that a rate of write requests of the first application instance over the period of time exceeds a threshold rate of write requests.

9. A system for adjusting storage volume size of an application instance, comprising:
 a memory; and
 a hardware processor communicatively coupled with the memory and configured to:
  identify a first application instance running on a computing device, wherein the first application instance has an assigned first storage volume on a device storage of the computing device;
  collect, over a period of time, usage data of the device storage;
  determine, based on the collected usage data, whether a usage capacity of the first storage volume of the first application instance is reaching a maximum capacity of the first storage volume;
  in response to determining that the usage capacity of the first storage volume is reaching the maximum capacity of the first storage volume, adjust a size of the first storage volume by a first amount to accommodate usage of the first application instance;
  subsequent to adjusting the size of the first storage volume, determine that the usage capacity of the first storage volume has decreased below the maximum capacity of the first storage volume; and
  readjust, during runtime of the first application instance, the size of the first storage volume to the usage capacity that is less than the maximum capacity of the first storage volume.

10. The system of claim 9, wherein the hardware processor is configured to adjust the size of the first storage volume by:
 identifying free space on the device storage;
 allocating at least a portion of the free space to the first storage volume, wherein the at least the at portion of the free space is the first amount.

11. The system of claim 9, wherein a second application instance is concurrently running with the first application instance, wherein the second application instance has an assigned second storage volume, and wherein the hardware processor is configured to adjust the size of the first storage volume by:
 determining, based on the collected usage data, that a usage capacity of the second storage volume is below a maximum capacity of the second storage volume by at least the first amount; and
 reducing a size of the second storage volume by the first amount.

12. The system of claim 9, wherein a plurality of application instances comprising the first application instance is running on the computing device, wherein each application instance has an assigned respective storage volume on the device storage, and wherein the hardware processor is configured to adjust the size of the first storage volume by:
 executing a machine learning algorithm that is trained to output volume sizes for the plurality of application instances based on historical usage data of the plurality of application instances, wherein the machine learning algorithm indicates a new volume size for the first storage volume that is greater than a current volume size of the first storage volume by the first amount.

13. The system of claim 12, wherein the hardware processor is configured to:
 generate for the machine learning algorithm an input vector that indicates changes in system usage, volume usage, and application instance usage over the period of time based on the collected usage data, wherein the collected usage data is time series data.

14. The system of claim 9, wherein the hardware processor is configured to adjust the size of the first storage volume in response to determining that the usage capacity of the first storage volume will reach the maximum capacity of the first storage volume within a threshold period of time based on write requests of the first application instance.

15. The system of claim 9, wherein the hardware processor is configured to adjust the size of the first storage volume in response to determining that an amount of write requests of the first application instance has reached a threshold amount of write requests.

16. The system of claim 9, wherein the hardware processor is configured to adjust the size of the first storage volume in response to determining that a rate of write requests of the first application instance over the period of time exceeds a threshold rate of write requests.

17. A non-transitory computer readable medium storing thereon computer executable instructions for adjusting storage volume size of an application instance, including instructions for:
- identifying a first application instance running on a computing device, wherein the first application instance has an assigned first storage volume on a device storage of the computing device;
- collecting, over a period of time, usage data of the device storage;
- determining, based on the collected usage data, whether a usage capacity of the first storage volume of the first application instance is reaching a maximum capacity of the first storage volume;
- in response to determining that the usage capacity of the first storage volume is reaching the maximum capacity of the first storage volume, adjusting a size of the first storage volume by a first amount to accommodate usage of the first application instance;
- subsequent to adjusting the size of the first storage volume, determining that the usage capacity of the first storage volume has decreased below the maximum capacity of the first storage volume; and
- readjusting, during runtime of the first application instance, the size of the first storage volume to the usage capacity that is less than the maximum capacity of the first storage volume.

* * * * *